(12) United States Patent
Tanide

(10) Patent No.: US 9,841,744 B2
(45) Date of Patent: Dec. 12, 2017

(54) PROGRAMMABLE CONTROLLER, PERIPHERAL DEVICE THEREOF, AND TABLE DATA ACCESS PROGRAM OF PROGRAMMABLE CONTROLLER

(71) Applicant: Mitsubishi Electric Corporation, Tokyo (JP)

(72) Inventor: Hajime Tanide, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 14/890,187

(22) PCT Filed: May 17, 2013

(86) PCT No.: PCT/JP2013/063855
§ 371 (c)(1),
(2) Date: Nov. 10, 2015

(87) PCT Pub. No.: WO2014/184962
PCT Pub. Date: Nov. 20, 2014

(65) Prior Publication Data
US 2016/0098028 A1 Apr. 7, 2016

(51) Int. Cl.
*G05B 19/04* (2006.01)
*G05B 19/042* (2006.01)
*G05B 19/05* (2006.01)

(52) U.S. Cl.
CPC ....... *G05B 19/0426* (2013.01); *G05B 19/056* (2013.01); *G05B 2219/13004* (2013.01); *G05B 2219/13041* (2013.01); *G05B 2219/15064* (2013.01); *G05B 2219/2241* (2013.01)

(58) Field of Classification Search
CPC .................................................. G05B 17/0426
See application file for complete search history.

(56) References Cited

U.S. PATENT DOCUMENTS

2010/0198781 A1   8/2010   Yuine et al.

FOREIGN PATENT DOCUMENTS

| JP | 10-003303 A | 1/1998 |
|---|---|---|
| JP | 2000-267703 A | 9/2000 |
| JP | 2001-014008 A | 1/2001 |
| JP | 2002-023812 A | 1/2002 |
| JP | 2004-302849 A | 10/2004 |

(Continued)

OTHER PUBLICATIONS

Office Action for JP 2013-541092 dated Oct. 29, 2013.
(Continued)

*Primary Examiner* — Grace Park
(74) *Attorney, Agent, or Firm* — Sughrue Mion, PLLC; Richard C. Turner

(57) ABSTRACT

A programmable controller includes a command execution unit that executes multiple commands in a user program in order; a database storage unit that stores therein a database that holds data used in a process performed by the command execution unit in a table format; a database-query-command generation unit that, when the commands include a command to access the database, converts the access command into a database query command described in a database query language; and a database management unit that accesses the database in the database storage unit and acquires data specified by the database query command.

14 Claims, 14 Drawing Sheets

(56) References Cited

FOREIGN PATENT DOCUMENTS

| | | | |
|---|---|---|---|
| JP | 2007-080286 | A | 3/2007 |
| JP | 2008-282323 | A | 11/2008 |
| JP | 2009-086863 | A | 4/2009 |
| JP | 2010-198132 | A | 9/2010 |
| JP | 2010-250584 | A | 11/2010 |
| JP | 2012-108642 | A | 6/2012 |
| WO | 2008/146477 | A1 | 12/2008 |

OTHER PUBLICATIONS

Exam Report for TW 102142790 dated Feb. 5, 2015.
International Search Report for PCT/JP2013/063855 dated Jun. 11, 2013.

FIG.3

DATA STRUCTURE

|  | ROW 0 (PRODUCT NUMBER) | ROW 1 (LENGTH) | ROW 2 (WIDTH) | ROW 3 (HEIGHT) |
|---|---|---|---|---|
| COLUMN 0 (PRODUCT 1) | 1 | 11520 | 727 | 300 |
| COLUMN 1 (PRODUCT 2) | 2 | 11000 | 653 | 550 |
| COLUMN 2 (PRODUCT 3) | 3 | 9000 | 221 | 700 |
| COLUMN 3 (PRODUCT 4) | 4 | 5000 | 442 | 200 |
| COLUMN 4 (PRODUCT 5) | 5 | 21000 | 569 | 900 |

FIG. 4(a)    DB_OPEN    A1  A2  A3

FIG. 4(b)    DB_OPEN    D1000  D1100  M0

FIG. 4(c)

| DEVICE | VALUE |
|---|---|
| ⋮ | ⋮ |
| D1000 | 127 |
| D1001 | 0 |
| D1002 | 0 |
| D1003 | 1 |
| D1004 |  |
| D1005 | "MyDB" |
| D1006 |  |
| ⋮ | ⋮ |
| D1100 |  |
| ⋮ | ⋮ |

~12

D1000 ← NUMBER OF 25TH TO 32ND BITS OF IP ADDRESS
D1001 ← NUMBER OF 17TH TO 24TH BITS OF IP ADDRESS
D1002 ← NUMBER OF 9TH TO 16TH BITS OF IP ADDRESS
D1003 ← NUMBER OF 1ST TO 8TH BITS OF IP ADDRESS
D1004 ← DATABASE NAME

PARAMETER A1 { D1000 – D1006 }
PARAMETER A2 { D1100 }

FIG. 5(a)   DB_SELECT   B1  B2  B3  B4  B5

FIG. 5(b)   DB_SELECT   D1100  D1200  D0  D100  M1

FIG. 5(c)

| DEVICE | VALUE | |
|---|---|---|
| D0 | 2 | ← NUMBER OF FIELDS |
| D1 D2 D3 | "LENGTH" | ← FIELD NAME 1 |
| D4 D5 D6 | "HEIGHT" | ← FIELD NAME 2 |
| ⋮ | ⋮ | |
| D100 | 1 | ← NUMBER OF READ RECORDS |
| D101 | 9000 | ← READ DATA 1 FOR FIELD NAME 1 |
| D102 | 700 | ← READ DATA 2 FOR FIELD NAME 2 |
| ⋮ | ⋮ | |
| D1200 D1201 D1202 D1203 D1204 D1205 | "PRODUCT SIZE" | ← TARGET TABLE NAME |
| D1206 D1207 D1208 D1209 D1210 | "PRODUCT NUMBER" | ← CONDITION FIELD NAME |
| D1211 D1212 | "=" | ← CONDITION |
| D1213 | 3 | ← CONDITION VALUE |
| ⋮ | ⋮ | |

PARAMETER B3: D1–D6 block
PARAMETER B4: D100–D102 block
PARAMETER B2: D1200–D1213 block Table reference: ~12

FIG. 6(a)  DB_CLOSE   C1

FIG. 6(b)  DB_CLOSE   D1100

SELECT LENGTH, HEIGHT
FROM PRODUCT SIZE
WHERE PRODUCT NUMBER=3

SELECT D1 TO D3, D4 TO D6
FROM D1200 TO D1204
WHERE D1205 TO D1209, D1210 TO D1211, D1212

DATABASE-ACCESS SETTING INFORMATION

TARGET DATABASE

| IP ADDRESS | 127.0.0.1 |
|---|---|
| DATABASE NAME | MyDB |

TARGET TABLE

| TABLE NAME | PRODUCT SIZE |
|---|---|

RELATION BETWEEN FIELD NAME AND DEVICE

| FIELD NAME | RELATION | DEVICE |
|---|---|---|
| LENGTH | → | D101 |
| HEIGHT | → | D102 |

READ CONDITION

| FIELD NAME | RELATION | DEVICE/VALUE |
|---|---|---|
| PRODUCT NUMBER | = | D1212 |

EXECUTION TRIGGER

| TRIGGER DEVICE | CONDITION |
|---|---|
| M0 | OFF→ON |

SELECT FIELD NAME @ RELATION BETWEEN FIELD NAME AND DEVICE

FROM TABLE NAME @ TARGET TABLE

WHERE FIELD NAME, RELATION, DEVICE/VALUE @ READ CONDITION

PROGRAMMABLE CONTROLLER, PERIPHERAL DEVICE THEREOF, AND TABLE DATA ACCESS PROGRAM OF PROGRAMMABLE CONTROLLER

CROSS REFERENCE TO RELATED APPLICATIONS

This application is a National Stage of International Application No. PCT/JP2013/063855 filed May 17, 2013, the contents of all of which are incorporated herein by reference in their entirety.

FIELD

The present invention relates to a programmable controller, a peripheral device thereof, and a table data access program for use with a programmable controller.

BACKGROUND

A programmable controller reads or writes device data that is included in the programmable controller according to a sequence program created by a user. In response thereto, for example, a state of an input device connected to the programmable controller such as a relay, a switch, and a sensor is acquired, or an output device such as an actuator and a valve is controlled. For example, recipe data such as the size and color of a manufactured product and results data such as the number of production and the number of defective products for each manufactured product are also stored as the device data. Therefore, when an operator creates a sequence program and acquires data required for controlling an input/output device from the recipe data, products can be flexibly changed. Further, when a sequence program is created so as to store the control result as the results data, it is easy to perform stock management of members required for production.

Data such as the recipe data and the results data is generally stored in a programmable controller in a two-dimensional data table (hereinafter, "table") format such as CSV (Comma Separated Values) so as to be easily processed by a high-level computer system. When the programmable controller accesses the data, the programmable controller needs to read the data into a device memory. To uniquely identify table data (such as the recipe data and the results data) functioning as an element of a table, a column number and a row number of the table may be specified. However, the device memory does not have any columns and rows, the table data is only successively provided thereon, and thus when the programmable controller accesses the device data on the device memory, it is necessary to calculate a device address.

Conventionally, a technique is proposed in which one-dimensional data can be processed as two-dimensional table data also in a programmable controller (for example, Patent Literature 1). In this technique, a table definition command that includes a table identification number, the number of table columns, the number of table rows, and a head device address of a table is defined first for each table. An element is then extracted from the one-dimensional data by a table element read command to specify a read target element using a column number and a row number on the two-dimensional table data as parameters. The device address of the read target element on a device memory is calculated by using the head device address and the number of table rows of the table definition command and a column number and a row number of the table element read command.

CITATION LIST

Patent Literature

Patent Literature 1: Japanese Patent Application Laid-open No. 2010-198132

SUMMARY

Technical Problem

However, in the programmable controller described in Patent Literature 1, when a read target element of table data is read, it is necessary to perform two steps, that is, a step of reading table data into a device memory and a step of searching a read target element in the device memory. Therefore, there has been a problem that it takes time to search the read target element. Further, the device memory needs to have a storage capacity sufficient for reading the table data, and this causes an increase in the manufacturing cost of a programmable controller.

The present invention has been achieved in view of the above problems, and an objective of the present invention is to provide a programmable controller that, when data is read from a database, can reduce the number of reading steps from a database as compared to conventional arts, a table data access program of such a programmable controller, and a peripheral device that can program a program for use with such a programmable controller.

Solution to Problem

In order to achieve the objective mentioned above, the present invention relates to a programmable controller that includes a command execution unit that executes multiple commands in a user program in order; a database storage unit that stores therein a database that holds data used in a process performed by the command execution unit in a table format; a database-query-command generation unit that, when the commands include a command to access the database, converts the access command into a database query command described in a database query language; and a database management unit that accesses the database in the database storage unit and acquires data specified by the database query command.

Advantageous Effects of Invention

According to the present invention, a database-query-command generation unit converts a database access command into a database query command described in a database query language; a database management unit accesses a database of a database storage unit to acquire data specified by the database query command; and an END command processing unit writes the acquired data in an address specified by an access command of a user-data storage unit. Accordingly, when data is read from a database in a programmable controller, it is possible to reduce the number of reading steps from the database as compared to conventional techniques.

BRIEF DESCRIPTION OF DRAWINGS

FIG. 3 is a diagram illustrating an example of a database.

FIGS. 4(a), 4(b) and 4(c) are diagrams illustrating an example of the contents of a DB_OPEN command.

FIGS. 5(a), 5(b) and 5(c) are diagrams illustrating an example of the contents of a DB_SELECT command.

FIGS. 6(a) and 6(b) are diagrams illustrating an example of the contents of a DB_CLOSE command.

FIG. 14 is a diagram illustrating an example of the contents of database-access setting information according to the second embodiment.

DESCRIPTION OF EMBODIMENTS

Exemplary embodiments of a programmable controller, a peripheral device thereof, and a table data access program for use with a programmable controller according to the present invention will be explained below in detail with reference to the accompanying drawings. The present invention is not limited to the embodiments.

First Embodiment

Figure 1:
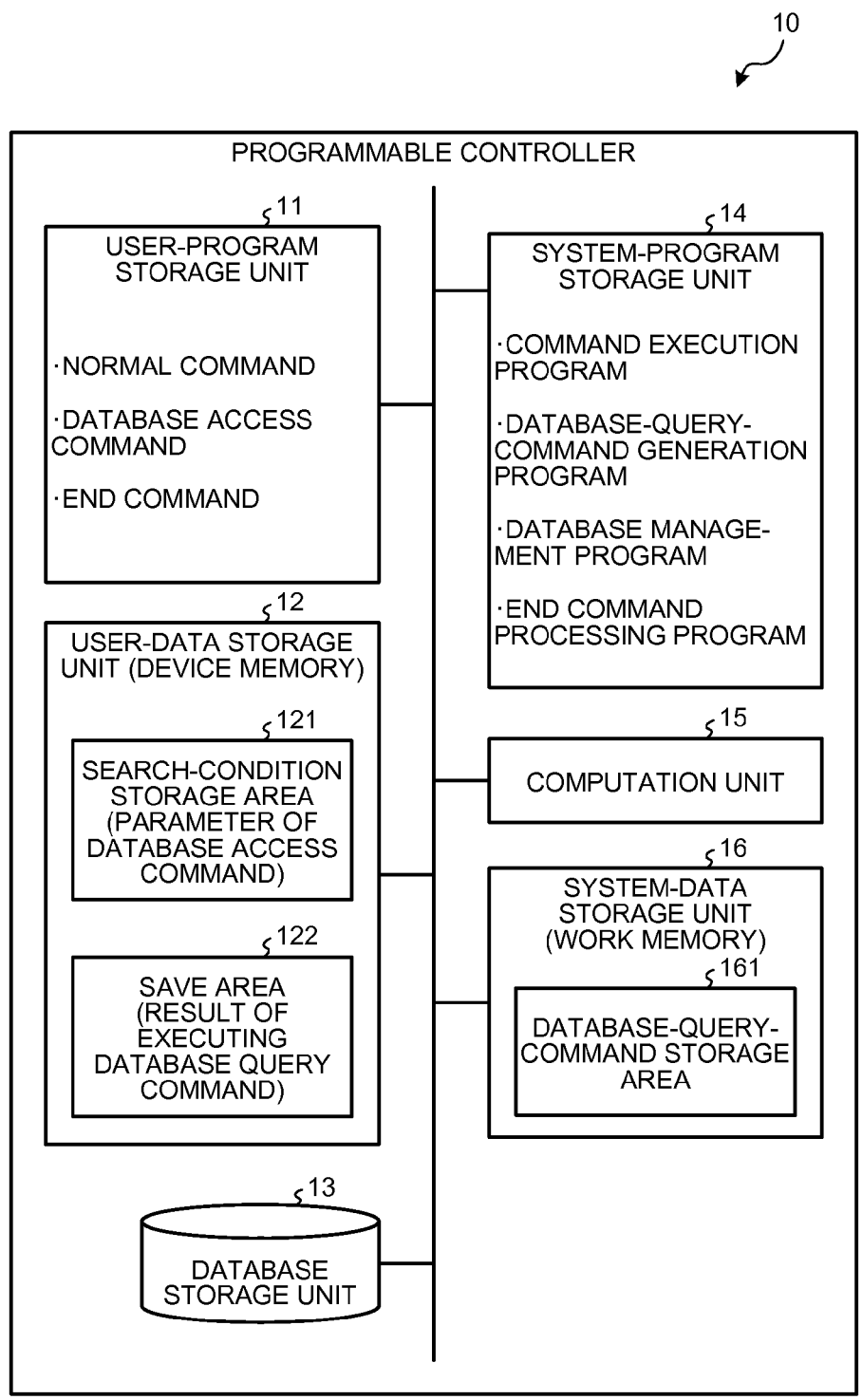
FIG. 1 is a block diagram schematically illustrating the functional configuration of a programmable controller according to a first embodiment.

FIG. 1 is a block diagram schematically illustrating the functional configuration of a programmable controller according to a first embodiment. A programmable controller 10 includes a user-program storage unit 11, a user-data storage unit 12 functioning as a user-data storage unit, a database storage unit 13 functioning as a database storage unit, a system-program storage unit 14, a computation unit 15, and a system-data storage unit 16 functioning as a system-data storage unit.

Figure 2:
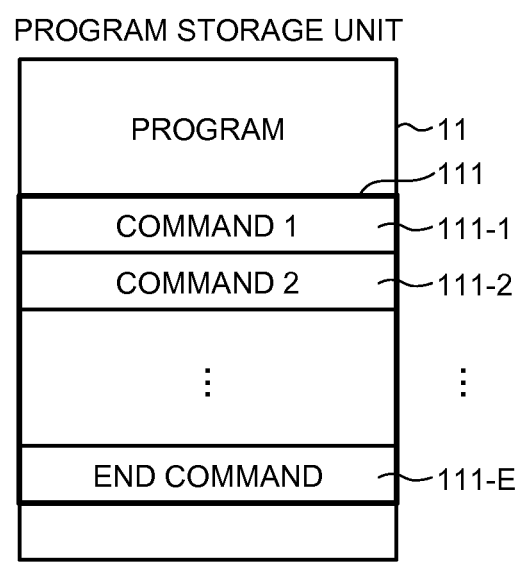
FIG. 2 is a diagram schematically illustrating a configuration of a program storage unit.

The user-program storage unit 11 stores therein a user program, such as a ladder program executed by the programmable controller 10. FIG. 2 is a diagram schematically illustrating a configuration of a program storage unit. A user program 111 is a set of multiple commands 111-1, 111-2, . . . , 111-E. It is assumed that a database access command to access a database is included in these commands 111-1, 111-2, . . . , 111-E. The commands include normal commands 111-1, 111-2, . . . to perform a program execution process and an END command 111-E that is executed at the end of the user program 111. The database access command is described later. The user-program storage unit 11 is constituted by a nonvolatile storage device such as a ROM (Read Only Memory) or an EEPROM (Electrically Erasable ROM).

The user-data storage unit 12 is a device memory that stores therein data used during executing a user program. The user-data storage unit 12 includes a search-condition storage area 121 that stores therein a search condition required during executing a database access command and the like and a save area 122 in which data is temporarily saved during executing a user program. The search-condition storage area 121 stores therein a storage position of a database including data to be acquired and a search condition for the data to be acquired. The search condition is set out in advance by a user with an engineering tool not illustrated. The storage position and the search condition are parameters of a database access command described later. The save area 122 stores therein the result of executing a database query command. A DRAM (Dynamic Random Access Memory), an SRAM (Static RAM), and the like can be used as the user-data storage unit 12.

The database storage unit 13 stores therein, for example, databases of recipe data such as the size and color of a manufactured product and results data such as the number of products produced and the number of defective products for each manufactured product. A database is constituted as two-dimensional table data. FIG. 3 is a diagram illustrating an example of a database. FIG. 3 exemplifies a product size table in which the size is set out for each product type. The row 0 stores therein a product number for identifying a product, and the rows 1 to 3 store therein the length, the width, and the height of a product, respectively. Columns 0 to 4 store therein records of the respective products. The database storage unit 13 is a secondary storage device and constituted as a nonvolatile storage device such as a flash memory and a hard disk.

The system-program storage unit 14 stores therein a system program executed by the computation unit 15, which is so-called firmware. Examples of the system program include a command execution program that executes a normal command of a user program; a database-query-command generation program that converts a database access command from a user program into a database query command in a format that allows the computation unit 15 to access data in the database storage unit 13; a database management program that accesses the database storage unit 13 in accordance with a database query command; an END command processing program that executes an END command of a user program, and the like. The system-program storage unit 14 is constituted by a nonvolatile storage device such as a ROM and an EEPROM.

The command execution program is a program that causes the computation unit 15 to sequentially interpret and execute the user program 111 stored in the user-program storage unit 11. Specifically, commands are executed in order from the first command 111-1 included in the user program 111 to a command immediately before the last END command 111-E. When a database access command is included in the user program 111, that process is sent to a database-query-command generation program.

The database-query-command generation program is a program that, when a database access command is included in the user program 111 of the user-program storage unit 11, causes the computation unit 15 to generate a database query command that is described in a database query language from a database access command that is described in a user program (for example, a ladder program) format. The database query language is, For example, SQL. The database query command is a command to access a database in practice during executing a database management program, and it specifically is a command of SQL. The generated database query command is stored in the system-data storage unit 16.

The database management program is a program that causes the computation unit 15 to read, interpret, and execute a database query command stored in a database-query-command storage area 161 of the system-data storage unit 16. Specifically, the database management program reads a database query command and directly extracts target data (an element) from a database in the database storage unit 13.

The END command processing program is a program that causes the computation unit 15 to execute the last END command 111-E of a user program stored in the system-program storage unit. The END command 111-E performs a process other than execution of a normal command that includes a process of communicating with a personal computer or an external device and a process of acquiring the result of the execution of a database query command by a database management program. In the process of acquiring the result of the execution of a database query command, data extracted by a database management program is written in a position that is specified by the database access command in the save area 122 of the user-data storage unit 12.

The computation unit 15 executes a system program (firmware) stored in the system-program storage unit 14. A command execution unit corresponds to the computation unit 15 that executes a command execution program, a database-query-command generation unit corresponds to the computation unit 15 that executes a database-query-command generation program, a database management unit corresponds to the computation unit 15 that executes a database management program, and an END command processing unit corresponds to the computation unit 15 that executes an END command processing program.

The system-data storage unit 16 is a work memory in which firmware temporarily places data. A database query command generated by the computation unit 15 is temporarily stored therein. A DRAM, an SRAM, and the like can be used as the system-data storage unit 16.

A programmable controller with such a configuration includes a CPU (Central Processing Unit), a ROM, a main storage device, a secondary storage device, and a network unit. Because a function performed by the computation unit 15 is described in a program, and the program is stored in the system-program storage unit 14 and executed by a CPU, a programmable controller with the above configuration can be acquired.

In the first embodiment, the programmable controller 10 directly accesses target data in a database in the database storage unit 13, acquires the target data, and stores the result in the save area 122 of the user-data storage unit 12. A database access command that effects such a process is defined by a ladder program (a user program). In this case, three commands, that is, a DB_OPEN command, a DB_SELECT command, and a DB_CLOSE command are defined.

(1) DB_OPEN Command

FIG. 4 are diagrams illustrating an example of the contents of a DB_OPEN command, where FIG. 4(a) is a diagram illustrating an example of a configuration of the DB_OPEN command, FIG. 4(b) is a diagram illustrating an example of the DB_OPEN command, and FIG. 4(c) is a diagram schematically illustrating the relation between a device memory and a parameter of the DB_OPEN command. The DB_OPEN command is a command to open an operation target database in the database storage unit 13. As illustrated in FIG. 4(a), the DB_OPEN command includes three parameters A1 to A3. The parameter A1 specifies an operation target database (target database to be open). The parameter A2 specifies a database identifier for identifying an open target database. The parameter A3 specifies a device indicating that an open process is completed.

As illustrated in FIG. 4(b), a device (an address) of the user-data storage unit 12 may be specified with the parameters A1 and A2. For example, a device (an address) of the user-data storage unit 12 is input in the parameters A1 and A2, and information from an open target database is stored in the device. With reference to FIG. 4(c), for example, values of an IP (Internet Protocol) address "127.0.0.1" of a device (a programmable controller) that includes the database storage unit 13 are input in devices D1000 to D1003, and a name "MyDB" of an open target database in the database storage unit 13 is input in devices D1004 to D1006. A completion device M0, which is turned on when an open process of an open target database is completed, is set in the parameter A3.

(2) DB_SELECT Command

FIG. 5 are diagrams illustrating an example of the contents of a DB_SELECT command, where FIG. 5(a) is a diagram illustrating an example of a configuration of the DB_SELECT command, FIG. 5(b) is a diagram illustrating an example of the DB_SELECT command, and FIG. 5(c) is a diagram schematically illustrating the relation between a device memory and a parameter of the DB_SELECT command. The DB_SELECT command is a command to fetch desired data from a database that is opened by a DB_OPEN command. As illustrated in FIG. 5(a), the DB_SELECT command includes five parameters B1 to B5. The parameter B1 specifies a database identifier for specifying an operation target database. The parameter B2 specifies a condition identifying a record that is read from an operation target table of an operation target database. The parameter B3 specifies a field that is read from the record specified by the parameter B2. The parameter B4 specifies a storage position of the data read by the parameters B2 and B3. The parameter B5 specifies a device indicating that a read process is completed.

As illustrated in FIG. 5(b), a device (an address) of the user-data storage unit 12 may be specified as the parameters B1 to B4. The parameter B1 is the same as the database identifier that is specified by the parameter A2 of a DB_OPEN command. The parameter B2 specifies a device of the user-data storage unit 12, in which read-target record specification information that includes a read target table and a read target record of an operation target database is stored. In this example, as illustrated in FIG. 5(c), the read-target record specification information includes "product size" that is a name of an operation target table stored in "D1200 to D1205" in the user-data storage unit 12, "product number" that is a name of a condition field stored in "D1206 to D1210", "=" that is a condition stored in "D1211 and D1212", and "3" that is a value of a condition stored in "D1213". That is, a condition extracting a record with a product number of "3" from a product size table is stored.

The parameter B3 specifies a device in the user-data storage unit 12 that stores therein read-field specification information that includes the number of fields and a field name to be acquired from the record specified by the parameter B2. In this example, as illustrated in FIG. 5(c), the read-field specification information includes "2" that is the number of fields stored in "D0" in the user-data storage unit 12; "length" that is a field name 1 stored in "D1 to D3"; and "height" that is a field name 2 stored in "D4 to D6". That is, a condition, which extracts data corresponding to two field names "length" and "height" from the record of a product size table with a product number of "3", is stored.

The parameter B4 is specified by the parameters B2 and B3 and specifies a position of the user-data storage unit 12 where read data is stored. In this example, as illustrated in FIG. 5(c), "1" that indicates the number of read records is specified in "D100" in the user-data storage unit 12, read data 1 "9000" corresponding to the field name 1 specified by the parameter B3 is stored in "D101", and read data 2 "700" corresponding to the field name 2 specified by the parameter B3 is stored in "D102". A completion device M1, which is turned on when a read process from an operation target database is completed, is set in the parameter B5.

(3) DB_CLOSE Command

FIG. 6 are diagrams illustrating an example of the contents of a DB_CLOSE command, where FIG. 6(a) is a diagram illustrating an example of a configuration of the DB_CLOSE command, and FIG. 6(b) is a diagram illustrating an example of the DB_CLOSE command. The DB_CLOSE command is a command to close an operation target database in the database storage unit 13. As illustrated in FIG. 6(a), the DB_CLOSE command includes a parameter C1. The parameter C1 specifies a database identifier for specifying a close target database. The database identifier is the same as the database identifier that is specified by the parameter A2 of the DB_OPEN command or the parameter B1 of the DB_SELECT command. As illustrated in FIG. 6(b), a device (an address) of the user-data storage unit 12 may be specified as the parameter C1.

Figure 7:
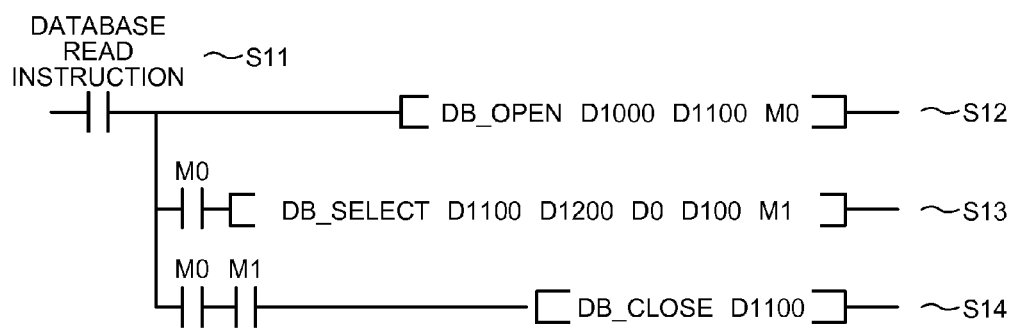
FIG. 7 is a diagram illustrating an example of an instruction to read a database in a ladder program.

With these three database access commands, a command to access the database storage unit 13 is written in a ladder program. FIG. 7 is a diagram illustrating an example of an instruction to read a database in a ladder program. An outline of such an operation of a ladder program is described here.

First, when an instruction to read a database is issued (Step S11), a DB_OPEN command is executed (Step S12). As illustrated in FIG. 4, a database "MyDB" of a device with an IP address of "127.0.0.1" among the respective devices of the user-data storage unit 12 is opened. When an open process of an operation target database is completed, a device "M0" is turned on.

When the device "M0" is turned on, a DB_SELECT command is then executed (Step S13). In the DB_SELECT command, a process of reading data corresponding to "length" and "height" from a record of "product size table" with "product number" of "3" from the respective devices of the user-data storage unit 12. When the read process is completed, a device "M1" is turned on.

When the devices "M0" and "M1" are turned on, a DB_CLOSE command is then executed (Step S14). In the DB_CLOSE command, the database "MyDB" functioning as an operation target database is closed. In this way, a process of accessing a database ends.

Figure 8:
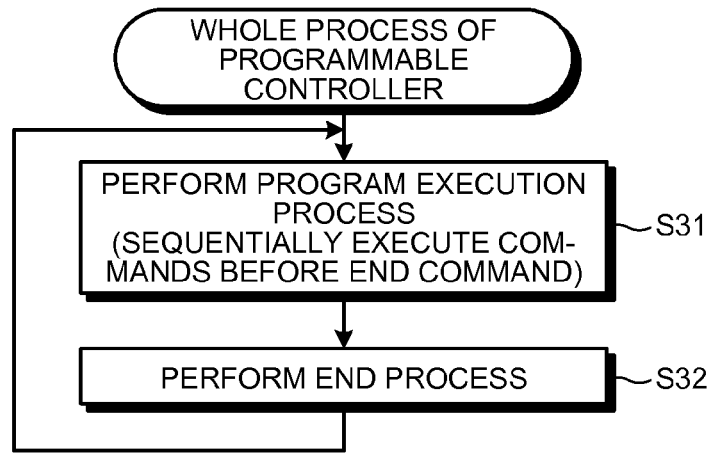
FIG. 8 is a flowchart illustrating an example of a procedure of the whole process of the programmable controller.

Next, an operation process of the programmable controller 10 is described. FIG. 8 is a flowchart illustrating an example of a procedure of the whole process of the programmable controller. The computation unit 15 of the programmable controller 10 performs first a program execution process of executing a normal command of the user program 111 stored in the user-program storage unit 11 (Step S31). In this case, commands from the command 111-1 to a command before the END command 111-E in the user program 111 illustrated in FIG. 2 are executed in the order described above.

After the computation unit 15 executes normal commands before the END command 111-E of the user program 111, the computation unit 15 performs an END process with the END command 111-E in accordance with an END command processing program (Step S32). In the END process, communication with a personal computer or an external device that is connected via a communication line to the programmable controller 10 is performed, and a process other than execution of the normal commands is also performed.

When the END process ends, the process returns to Step S31 again, and the computation unit 15 processes commands in order from the command 111-1 of the user program 111. As in this manner, in the programmable controller 10, the commands 111-1 to 111-E of the user program 111 are repeatedly performed in the order as described above.

Figure 9:
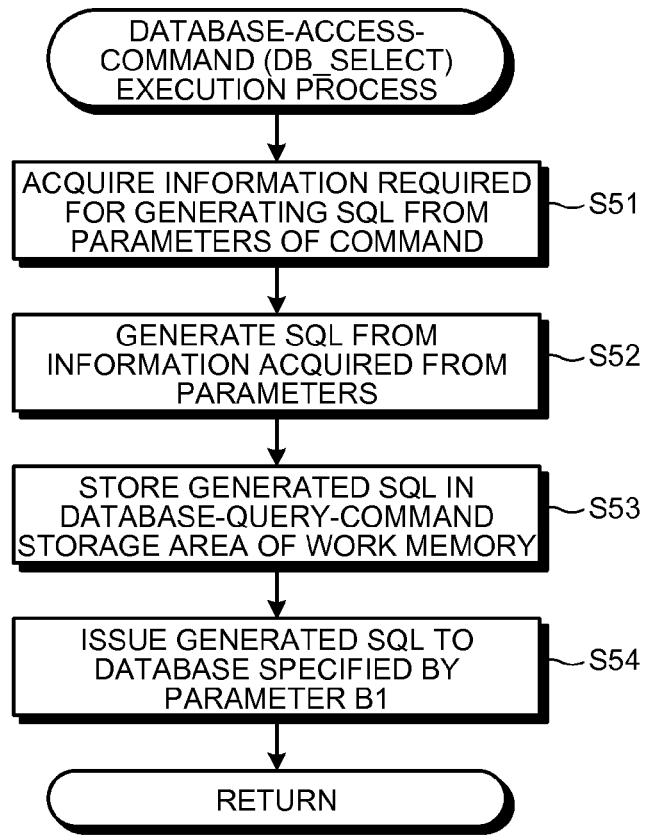
FIG. 9 is a flowchart illustrating an example of a procedure of a database-access-command execution process.
Figure 10:
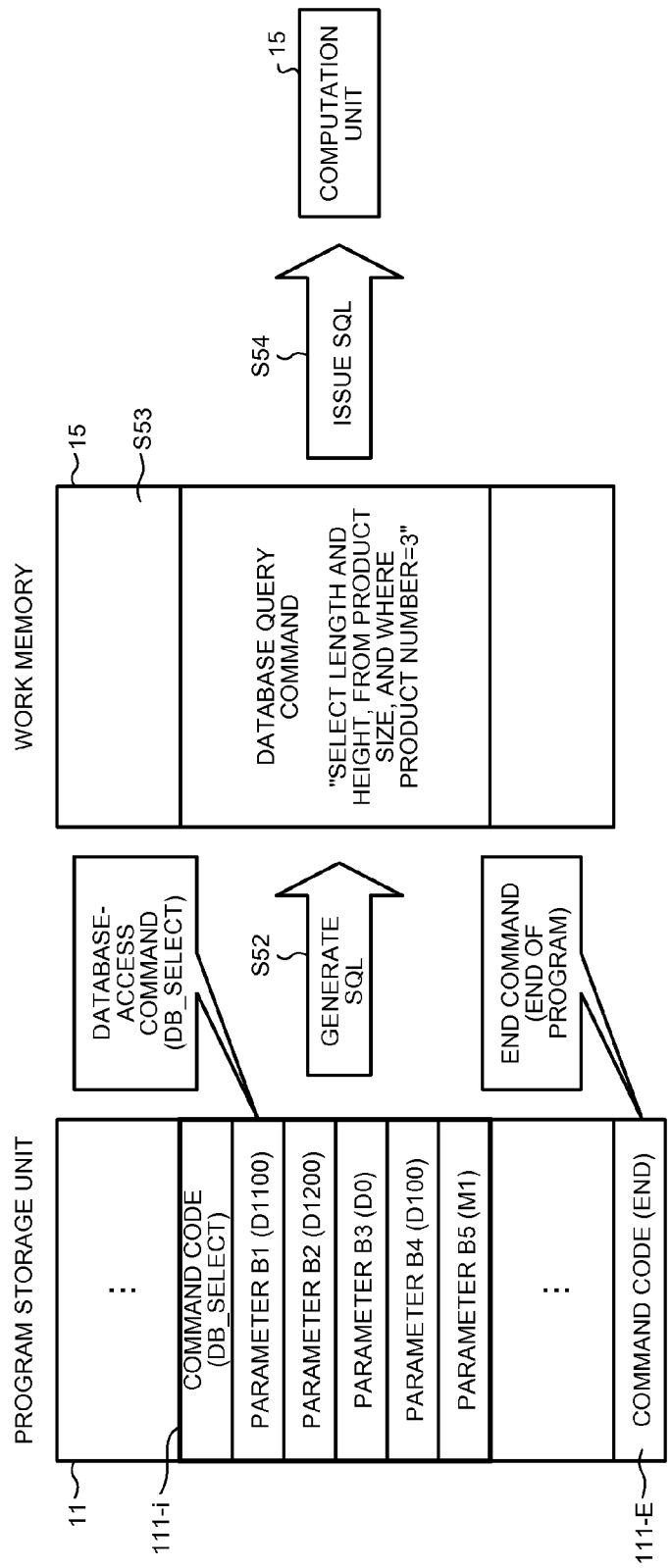
FIG. 10 is a diagram schematically illustrating a process of a database access command.

When a database access command is detected in the program execution process at Step S31, a database-access-command execution process is performed. FIG. 9 is a flowchart illustrating an example of a procedure of a database-access-command execution process; FIG. 10 is a diagram schematically illustrating a process of a database access command; and FIG. 11 are diagrams illustrating an example of a process of generating a database query command from a database access command.

When the computation unit 15 detects a database access command during the program execution process at Step S31 in FIG. 8 and sends the detected database access command to a database-query-command generation program, the database-access-command execution process illustrated in FIG. 9 is performed. The computation unit 15 performs an open process of a target database on the basis of the database-query-command generation program and acquires information required for generating SQL from parameters of the acquired database access command (a DB_SELECT command) (Step S51).

In this example, the parameters B2 and B3 of the DB_SELECT command are referred to, and an operation target table is extracted from an operation target database; a record is extracted from the operation target table; and a field is extracted from the operation target record. As exemplified in FIG. 5, these conditions are stored in addresses specified by the parameters B2 and B3 of the user-data storage unit 12.

Figures 11A, 11B, 12:
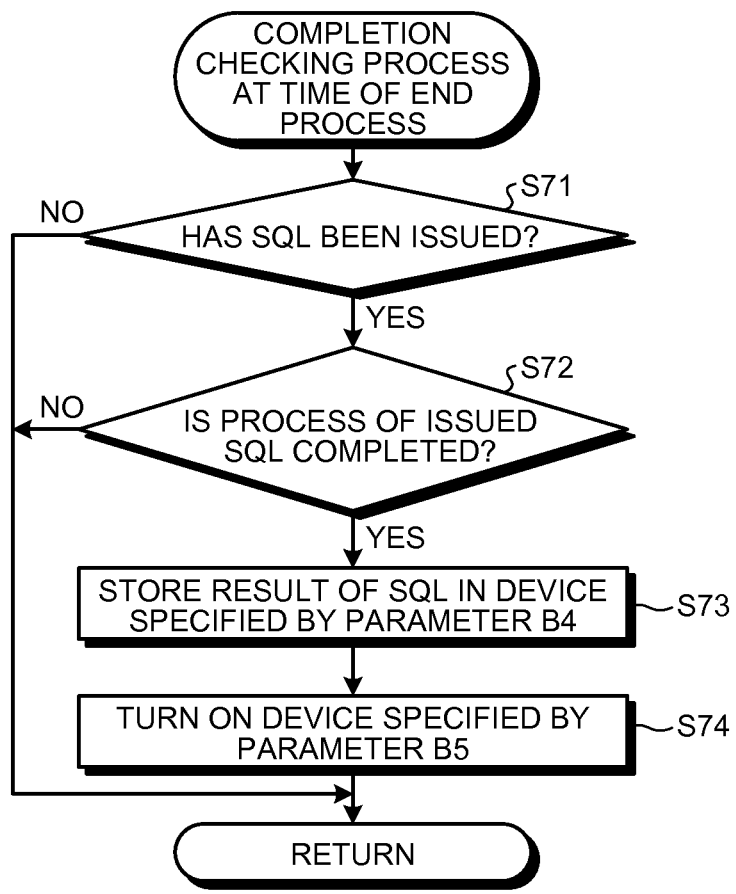
FIGS. 11(a) and 11(b) are diagrams illustrating an example of a process of generating a database query command from a database access command.
FIG. 12 is a flowchart illustrating an example of a procedure of a completion checking process during an END process.

Next, the computation unit 15 generates a database query command (a SQL sentence) from the acquired information (Step S52). FIG. 11(a) illustrates a SQL sentence that is generated from a database access command of the ladder program illustrated in FIG. 5(b). The SQL sentence includes a SELECT phrase, a FROM phrase, and a WHERE phrase, and a parameter is set out for each of the phrases. The SQL sentence is generated from the database access command in accordance with command conversion information in which a parameter of a database access command corresponds to a parameter of a SQL sentence. FIG. 11(b) illustrates an example of the command conversion information. In the command conversion information, a parameter of a SQL sentence is defined by using a device of the user-data storage unit 12. Accordingly, it is possible to generate a SQL sentence (a database query command) from the database access command illustrated in FIG. 5(b). The command conversion information described above is only an example, and command conversion information may be prepared depending on the type of a SQL sentence.

Next, the computation unit 15 stores the generated SQL sentence in the database-query-command storage area 161 of the system-data storage unit 16 (Step S53).

The computation unit 15 issues the generated SQL sentence to a database that is specified by the parameter B1 of the DB_SELECT command functioning as a database access command on the basis of a database management program (Step S54). Accordingly, the computation unit 15 directly accesses a specified database in the database storage unit 13 according to the SQL sentence and acquires target data. The database-access-command execution process then ends and the process returns to Step S31 in FIG. 8.

Generally, a process of a database is slower than a process of performing the programmable controller 10, and thus the database-access-command execution process is completed after SQL is issued, without waiting for the result of processing a database. The checking completion of the result of processing a database is performed in an END process.

A process of checking completion when SQL is issued in the END process at Step S32 in FIG. 8 is described. FIG. 12 is a flowchart illustrating an example of a procedure of a completion checking process during an END process.

First, the computation unit 15 determines whether SQL has been issued (Step S71). If SQL has not been issued (NO at Step S71), it means that the computation unit 15 does not issue SQL and thus it is not necessary to perform completion checking, so that the process ends.

When SQL has been issued (YES at Step S71), it is determined whether a process of issued SQL is completed (Step S72). If the process of issued SQL is not completed (NO at Step S72), no process is performed and the completion checking process ends. In this case, checking is performed again during the next END process.

Meanwhile, when the process of issued SQL is completed (YES at Step S72), the computation unit 15 stores the result of the acquired SQL in a position of the user-data storage unit 12 specified by the parameter B4 of a DB_SELECT command (Step S73). The computation unit 15 then turns on a completion device specified by the parameter B5 of the DB_SELECT command (Step S74), and a process of closing a target database is performed. In this way, the completion checking process during the END process ends.

While the above example has described a database access command to read data from a database, the present invention is not limited thereto. For example, it is possible to define a data write command to add data to a database, to change data, or to erase data from a database. Such a database write command at least includes, as parameters, a database identifier (database specification information) for specifying an operation target database, a name of a table to which data in an operation target database is added, a name of a field in which data of an operation target table is written, and the contents of data to be written. As described above, the database access command is a command to access a database such as a command to read or write data stored in a database.

In the first embodiment, a database access command used in a ladder program is defined, a parameter specified by the database access command corresponds to a parameter of a SQL sentence, and if the database access command is present in a user program, a SQL sentence is generated from the database access command in accordance with the correspondence and SQL is issued. Accordingly, in the programmable controller 10, it is possible to directly access a database and acquire desired data without loading a two-dimensional database in the database storage unit 13 functioning as a secondary storage device into the one-dimensional user-data storage unit 12 as in conventional techniques. As a result, it is possible to acquire data from a database by a single step, and data can be acquired more quickly than conventional techniques.

It is not necessary to load a database into the user-data storage unit 12, and thus it is not necessary to set the capacity of the user-data storage unit 12 in view of the size of a database. That is, the amount of data that is read from the database storage unit 13 into the user-data storage unit 12 is reduced to the minimum required for a process. Accordingly, the capacity (the usage) of the user-data storage unit 12 can be reduced compared to conventional techniques.

Furthermore, as a database is used when data required for the programmable controller 10 is acquired, it is not necessary to calculate a storage place (an address) of data during loading a two-dimensional database into the one-dimensional user-data storage unit 12 in a ladder program. As a result, programming becomes easy. Further, even when the data structure of a database is changed, if data of the same field is acquired, it is not necessary to change a database access command generated in a user program.

Further, a command only for a user program is defined, and thus it is possible to access a database from the programmable controller 10 and even a user of the programmable controller 10 who is not familiar with a database-specific language such as SQL can create a program using data in a database.

Second Embodiment

The first embodiment has described a case of defining a database access command, incorporating the database access command in a user program (a ladder program), and using the database access command. A second embodiment describes a case where database-operation setting information is defined instead of a database access command and when a database read instruction is performed, the database-operation setting information is read and processes identical to those of the first embodiment are performed.

Figure 13:
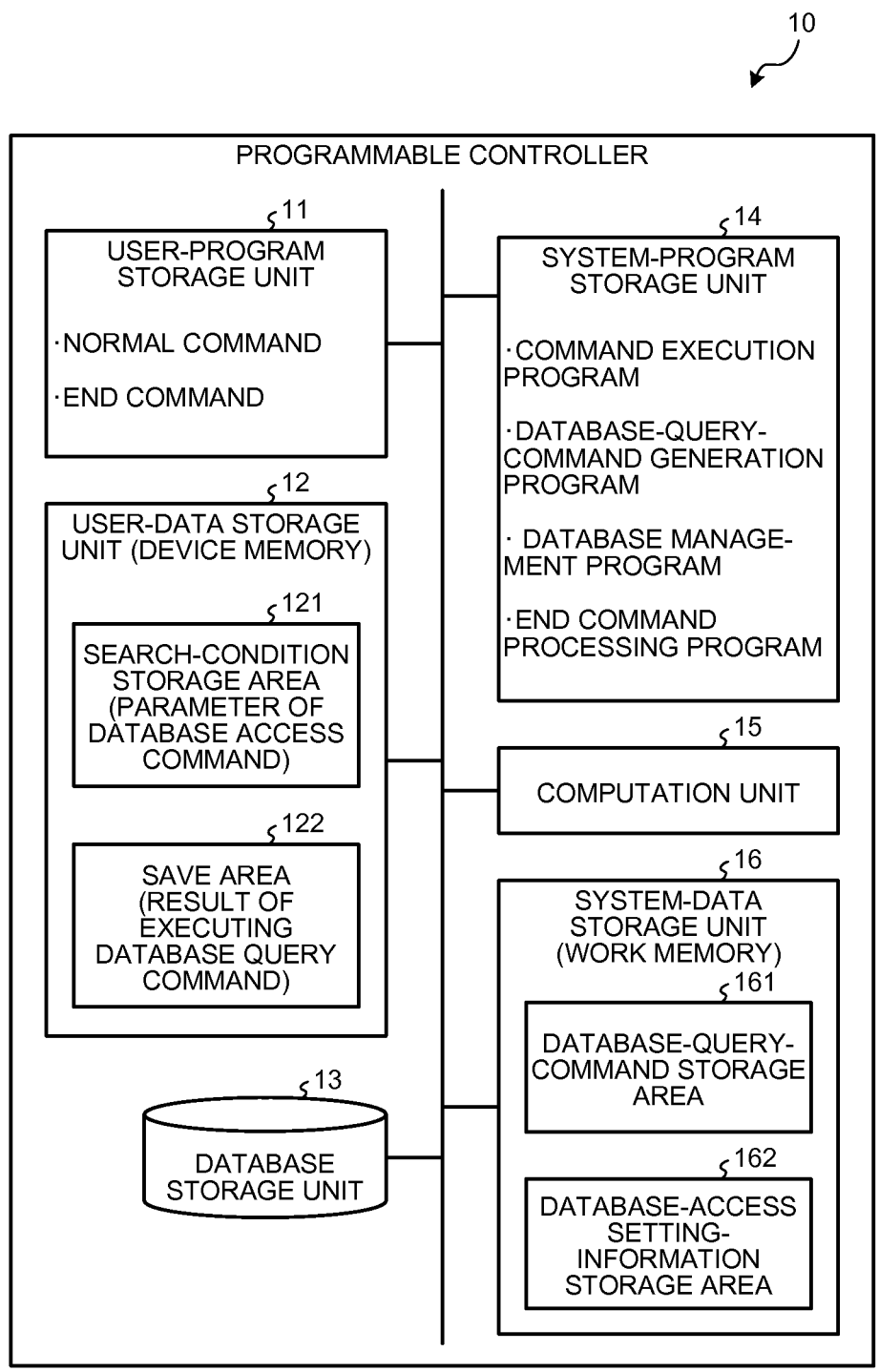
FIG. 13 is a block diagram schematically illustrating the functional configuration of a programmable controller according to a second embodiment.

FIG. 13 is a block diagram schematically illustrating the functional configuration of a programmable controller according to the second embodiment. The programmable controller 10 according to the second embodiment is different from that of the first embodiment in that a database access command is not included in a user program of the user-program storage unit 11; and the system-data storage unit 16 includes, in addition to the database-query-command storage area 161, a database-access setting-information storage area 162 that stores therein database-access setting information. When a database read instruction of a user program (a ladder program) is turned on, the computation unit 15 generates a database query command in accordance with database-access setting information 162A.

FIG. 14 is a diagram illustrating an example of the contents of database-access setting information according to the second embodiment. The database-access setting information 162A includes, as setting items, a target database, a target table, the relation between a field name and a device, a read condition, and an execution trigger.

The target database specifies an operation target database. For example, the target database specifies an address (an IP address) of a device (a programmable controller) in which an operation target database is stored and a database name of a device specified by the IP address. The target table specifies an operation target table of a target database.

The relation between a field name and a device specifies a field name of data to be acquired from a target table and a storage position of the acquired data in the user-data storage unit 12. The read condition specifies a target column (a target record) to be read from a target table. The execution trigger specifies a timing of storing read data in the user-data storage unit 12.

That is, an operation target database is identified by an IP address and a database name of the item "target database", and an operation target table of the operation target database is specified by a table name of the item "target table". On the basis of a record identified by a field name of the item "read condition", data identified by a field name of the item "relation between field name and device" is set as read data, and this data is stored in a device of a device memory specified by the relation between a field name and a device. The data is then read when a trigger device of the item "execution trigger" is turned on.

Figures 15, 16:
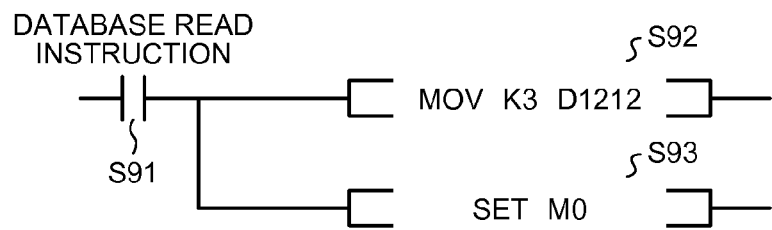
FIG. 15 is a diagram illustrating an example of a user program of a database read instruction according to the second embodiment.
FIG. 16 is a diagram illustrating an example of command conversion information during generating a database query command from database-access setting information.

FIG. 15 is a diagram illustrating an example of a user program of a database read instruction according to the second embodiment. In the user program, when a database read instruction is turned on (Step S91), a process of storing "K3" that indicates a product number of a product table in "D1212" of the user-data storage unit 12 (Step S92) and a process of turning on bits of a device "M0" (Step S93) are performed.

The computation unit 15 thus generates a database query command according to a condition that is set in the database-access setting information 162A and stores the database-access setting information 162A in the system-data storage unit 16. FIG. 16 is a diagram illustrating an example of command conversion information during generating a database query command from database-access setting information. As illustrated in FIG. 16, in the command conversion information, a parameter of a SQL sentence is defined by using the contents of the database-access setting information 162A. The computation unit 15 thus generates the SQL sentence illustrated in FIG. 11(a).

While the example of the database-access setting information 162A illustrated in FIG. 14 is a case where the item "target database" specifies the programmable controller 10 itself. However, the programmable controller 10 is usually connected via a network, and thus data can be also acquired from databases in the database storage units 13 of other programmable controllers 10 (or other devices).

Figure 17A:
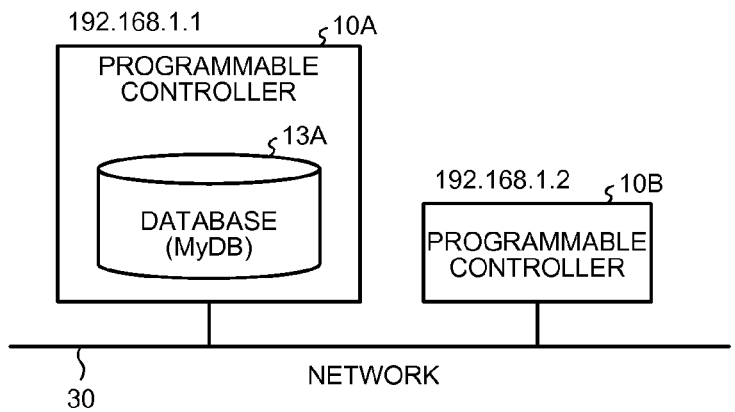
FIGS. 17(a), 17(b) and 17(c) are diagrams schematically illustrating a case of reading data from other programmable controllers connected to a network.
Figure 17B:
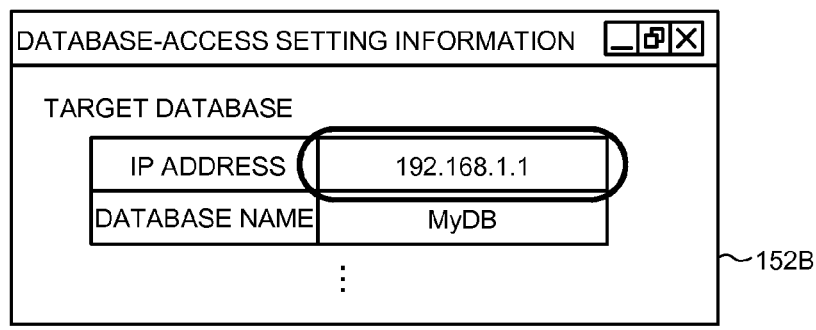
Figure 17C:
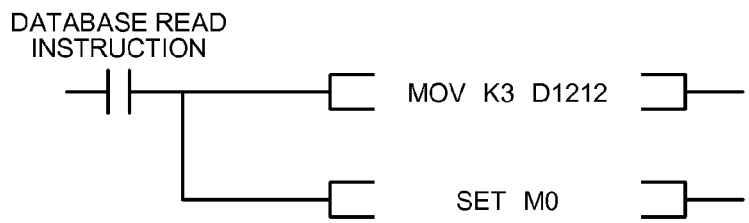

FIG. 17 are diagrams schematically illustrating a case of reading data from other programmable controllers connected to a network. FIG. 17(a) schematically illustrates a system configuration in which programmable controllers 10A and 10B are connected to a network 30. In this case, a database storage unit 13A is provided, and the programmable controller 10A with an IP address of "192.168.1.1" and the programmable controller 10B with an IP address "192.168.1.2" are connected to each other via the network 30. As illustrated in FIG. 17(b), in the programmable controller 10B, the IP address and the database name of the programmable controller 10A are set in an item "target database" of database-access setting information 152B. Accordingly, when a user program illustrated in FIG. 17(c) is read, it is possible to access a database in the database storage unit 13A of the programmable controller 10A and to acquire data.

In the second embodiment, a database access condition is set in database-access setting information, and if a database read instruction is turned on during executing a user program, the computation unit 15 generates a database query command in accordance with the database-access setting information. The computation unit 15 then accesses a database according to the generated database query command. In this manner, unlike the first embodiment, a database access command is not defined in a ladder program, and thus in addition to the effects of the first embodiment, it is easy for a user of the programmable controller 10 to perform setting of database access.

A condition of data to be acquired can be specified by database-access setting information, and thus, unlike the first embodiment, it is not necessary to store a condition acquiring target data in the user-data storage unit 12. As a result, as compared to the first embodiment, it is possible to further reduce the capacity of the user-data storage unit 12.

While the second embodiment has exemplified a case of reading data from a database, also in a case of writing data, such as adding data to a database, changing data in a database, and erasing data from a database, when a write condition is set in database-access setting information, a database query command can be generated on the basis of the database-access setting information.

Third Embodiment

A third embodiment describes an engineering tool that sets a user program in the first embodiment or sets database-access setting information in the second embodiment.

Figure 18:
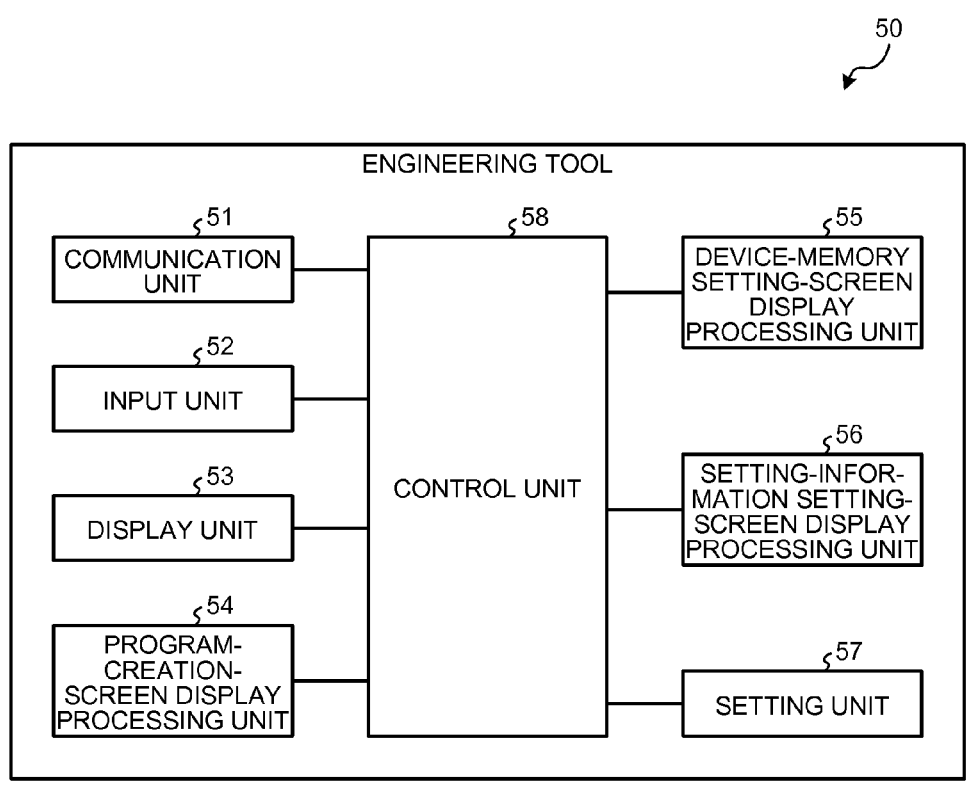
FIG. 18 is a block diagram schematically illustrating an example of the functional configuration of an engineering tool.

FIG. 18 is a block diagram schematically illustrating an example of the functional configuration of an engineering tool. An engineering tool 50 includes a communication unit 51, an input unit 52, a display unit 53, a program-creation-screen display processing unit 54, a device-memory setting-screen display processing unit 55, a setting-information setting-screen display processing unit 56, a setting unit 57, and a control unit 58 that controls these processing units.

The communication unit 51 communicates with the programmable controller 10. The input unit 52 is an input interface with a user such as a keyboard and a pointing device. For example, the input unit 52 receives input of a database access command or database-access setting information that is set in the programmable controller 10. The display unit 53 is a device that displays information to a user, such as a liquid display device.

The program-creation-screen display processing unit 54 has a function of displaying a user program creation screen on the display unit 53. When a ladder program is used as a user program, the program-creation-screen display processing unit 54 provides the environment for creating a ladder program to a user. When a database access command described in the first embodiment is used as a user program, the program-creation-screen display processing unit 54 processes a database access command to be usable on a user program creation screen.

The device-memory setting-screen display processing unit 55 has a function of displaying a device setting screen on the display unit 53. As described above, a storage position of a database to be read, a condition of data to be read from a database, data read from a database, and the like are stored in the user-data storage unit 12. The device memory setting screen is a screen for performing setting, for example, determining at which address each of these pieces of information is stored.

The setting-information setting-screen display processing unit 56 has a function of displaying a database-access setting-information setting screen on the display unit 53. In a case of accessing a database using database-access setting information as described in the second embodiment, for example, a setting screen of the database-access setting information illustrated in FIG. 14 is displayed on the display unit 53.

The setting unit 57 sets the contents that are set (input) by a user through the input unit 52 and determined in the program-creation-screen display processing unit 54, the device-memory setting-screen display processing unit 55, or the setting-information setting-screen display processing unit 56 in the programmable controller 10 via the communication unit 51.

According to the third embodiment, in the program-creation-screen display processing unit 54, the device-memory setting-screen display processing unit 55, and the setting-information setting-screen display processing unit 56, screens for setting a user program, a device memory, and database-access setting information are displayed to a user; and the setting unit 57 sets the contents set on each of the screens in the programmable controller 10. Therefore, it is possible to generate a database access command or database-access setting information that allows the programmable controller 10 to directly access a database in the database storage unit 13 and to acquire desired data, and to set the generated command or information in the programmable controller 10.

The method of reading data from a database in a user program including a database access command or a method of reading data from a database in accordance with database access setting in the programmable controller 10 described above can be configured as a program having a process procedure stored therein. The program can be realized by being executed in the programmable controller 10. The program is recorded in a computer-readable recording medium such as a hard disk, an SSD (Solid State Drive), a Floppy® disk, a CD (Compact Disk)-ROM, an MO (Magneto-Optical disk), and a DVD (Digital Versatile Disk or Digital Video Disk). In this case, the program can be read from a recording medium by the programmable controller 10 or can be read from a recording medium by an information processing terminal such as the engineering tool 50 connected to the programmable controller 10, installed in the programmable controller 10 via a network, and read by the programmable controller 10. In addition, the program can be distributed via a network (a communication line) such as the Internet.

INDUSTRIAL APPLICABILITY

As described above, the programmable controller according to the present invention is useful as a programmable controller that reads data from a database stored in a secondary storage device and performs processes on the read data.

REFERENCE SIGNS LIST 10, 10A, 10B programmable controller, 11 user-program storage unit, 12 user-data storage unit, 13, 13A database storage unit, 14 system-program storage unit, 15 computation unit, 16 system-data storage unit, 30 network, 50 engineering tool, 51 communication unit, 52 input unit, 53 display unit, 54 program-creation-screen display processing unit, 55 device-memory setting-screen display processing unit, 56 setting-information setting-screen display processing unit, 57 setting unit, 58 control unit, 121 search-condition storage area, 122 save area, 152B database-access setting information, 161 database-query-command storage area, 162 database-access setting-information storage area.

The invention claimed is:

1. A programmable controller comprising:
   a processor which executes multiple commands in a user program other than a last END command in order and that after the END command is executed by the processor, executes the commands of the user program again in order;
   a memory which stores a database that holds data used in a process performed by the processor in a table format;
   wherein, when the commands include a command to access the database, the processor is further configured to convert the access command into a database query command described in a database query language, to access the database in the memory and to acquire data specified by the database query command;
   wherein, after the commands in the user program are executed by the processor, the processor is further configured to execute the END command including a process of acquiring the result of executing the database query command,
   wherein, when a process corresponding to the database query command issued is completed, the processor performs a completion checking process of writing the data acquired by the processor in an address specified by the command to access the database of a user-data storage, and
   wherein, when the process corresponding to the database query issued is not completed, the processor is configured to further perform the completion checking process at a time of executing a next END command.

2. The programmable controller according to claim 1, wherein
   the access command includes, as a parameter, database specification information that specifies the database in the memory and an access-target specification condition that includes a name of a table in the database.

3. The programmable controller according to claim 2, wherein
   the access command is a command to acquire desired data from the database and further includes a storage position in which a search result with the access-target specification condition is stored as a parameter, and the access-target specification condition includes a field of data that is acquired in the table.

4. The programmable controller according to claim 2, wherein the access command is a command to write data in the database and further includes the data to be written as a parameter, and
   the access-target specification condition includes a field of the table in which the data is to be written.

5. The programmable controller according to claim 2, wherein
   each of the access-target specification conditions is stored in a predetermined position of the user-data storage, and
   the parameter is represented as a storage position in the access-target condition of the user-data storage.

6. The programmable controller according to claim 2, wherein
   the database-query-command generation unit generates the database query command from the access command in accordance with command conversion information in which a parameter of the access command corresponds to a parameter of the database query command.

7. A programmable controller comprising:
a processor to execute multiple commands in a user program in order;
at least one memory having a database storage, which stores therein a database that holds data used in a process performed by the processor in a table format;
the memory further comprises a system-data storage, which stores therein database-access setting information that sets a condition acquiring data included in the database in the database storage;
wherein, when the commands include an instruction to access the database, the processor converts the database-access setting information in the system-data storage into a database query command described in a database query language;
wherein the processor is further configured:
to access the database in the database storage, and
to access data specified by the database query command,
wherein the database-access setting information includes:
database specification information that specifies the database in the database storage, and
an access-target specification condition that includes a name of a table of the database, and
wherein the processor generates the database query command from the database-access setting information in accordance with command conversion information in which information included in the database-access setting information corresponds to a parameter of the database query command.

8. The programmable controller according to claim 7, wherein
the database-access setting information is information for executing a command to acquire desired data from the database and further includes a storage position in which a search result with the access-target specification condition is stored, and
the access-target specification condition includes a field of data that is acquired in the table.

9. The programmable controller according to claim 8, wherein
the processor generates the database query command from the database-access setting information in accordance with command conversion information in which the access-target specification condition and the storage position of the database-access setting information correspond to a parameter of the database query command.

10. The programmable controller according to claim 7, wherein
the database-access setting information is information for executing a command to write data in the database and further includes the data to be written, and
the access-target specification condition includes a field of the table in which the data is to be written.

11. The programmable controller according to claim 10, wherein
the processor generates the database query command from the database-access setting information in accordance with command conversion information in which the access-target specification condition and the data to be written of the database-access setting information correspond to a parameter of the database query command.

12. The programmable controller according to claim 7, wherein
the programmable controller is connected to another programmable controller having a database via a network, and
the database specification information can be specified with the database in the database storage unit of the another programmable controllers that is connected via a network.

13. A non-transitory computer readable medium storing a table data access program, which when executed by a programmable controller, causes the programmable controller to:
repeatedly execute commands of a user program in order from a first normal command to an END command described at an end of the commands and in the process of executing a normal command, accesses a database that holds data used in a process of executing a normal command in a table format, and
access the database when the normal command is executed,
wherein the table data access program, when executed, causes the programmable controller to further execute:
a database-query-command generation procedure of, when the normal command includes a command to access the database, converting the access command into a database query command described in a database query language;
a database management procedure of
accessing the database stored in a memory, and
accessing data in the database specified by the database query command so as to perform a predetermined process, and
an END command processing procedure of executing an END command including a process of acquiring the result of executing the database query command,
wherein in the END command processing procedure,
when a process corresponding to the database query command issued is completed, a completion checking process of writing the data acquired by the database management procedure in an address specified by the command to access the database of the memory is performed, and
when the process corresponding to the database query command issued is not completed, the completion checking process is performed at a time of executing a next END command.

14. A non-transitory computer readable medium storing a table data access program, which when executed by a programmable controller causes the programmable controller to:
repeatedly execute commands of a user program in order from a first normal command to an END command described at an end of the commands, and
access a database that holds data used in a process of executing a normal command in a table format, when the normal command is executed,
wherein the table data access program, when executed, causes the programmable controller to further execute:
a database-query-command generation procedure of, when the normal command includes an instruction to access the database, converting database-access setting information in a system-data memory into a database query command described in a database query language; and a database management procedure of
  accessing the database in the memory, and
  accessing data specified by the database query command so as to perform a predetermined process, wherein:
the database-access setting information includes
  database specification information that specifies the database, and
  an access-target specification condition that includes a name of a table of the database, and
wherein the table data access program, when executed, causes the programmable controller to generate the database query command from the database-access setting information in accordance with command conversion information in which information included in the database-access setting information corresponds to a parameter of the database query command.

* * * * *